United States Patent
Bulumulla et al.

(10) Patent No.: US 9,972,896 B2
(45) Date of Patent: May 15, 2018

(54) WIRELESS AIRCRAFT ENGINE MONITORING SYSTEM

(71) Applicant: General Electric Company, Schenectady, NY (US)

(72) Inventors: Selaka Bandara Bulumulla, Niskayuna, NY (US); David Patrick Calder, Baltimore, MD (US); Michael Joseph Dell'Anno, Clifton Park, NY (US); Andrew Michael Roach, Aberdeen, MD (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/191,124

(22) Filed: Jun. 23, 2016

(65) Prior Publication Data
US 2017/0369188 A1 Dec. 28, 2017

(51) Int. Cl.
*H01Q 1/28* (2006.01)
*B64D 29/00* (2006.01)
(Continued)

(52) U.S. Cl.
CPC ............. *H01Q 1/28* (2013.01); *B64C 7/02* (2013.01); *B64D 29/00* (2013.01); *B64D 29/06* (2013.01);
(Continued)

(58) Field of Classification Search
CPC .......... H01Q 1/28; H01Q 1/286; B64D 29/00; B64D 2045/0085; G01C 5/008;
(Continued)

(56) References Cited

U.S. PATENT DOCUMENTS 3,172,110 A 3/1965 Zieg
4,629,146 A * 12/1986 Lymons ................ B64D 29/06
180/69.2
(Continued)

FOREIGN PATENT DOCUMENTS

JP 11117811 A * 4/1999
WO WO-2010028729 A1 * 3/2010 ............. F01D 25/00

OTHER PUBLICATIONS

Extended European Search Report and Opinion issued in connection with corresponding EP Application No. 17176086.1 dated Nov. 16, 2017.

*Primary Examiner* — Behrang Badii
*Assistant Examiner* — David A Testardi
(74) *Attorney, Agent, or Firm* — Nitin N. Joshi

(57) ABSTRACT

An engine monitoring system for an aircraft engine having a nacelle extending annularly thereabout and a sensor positioned radially inward therefrom. The system includes an engine control device coupled communicatively to the sensor and configured to receive engine data from the sensor and/or receive instruction data from a transmitter device positioned radially outward from a nacelle radially outward surface. The system also includes a composite panel including at least a portion of the nacelle and a ground plane positioned radially inward from the nacelle radially outward surface, the composite panel including an antenna coupled communicatively to engine control device and a radome positioned radially outward from ground plane. The antenna is configured to at least one of receive engine data from the engine control device and transmit engine data to a receiver device, and receive instruction data from the transmitter device and transmit instruction data to the engine control device.

20 Claims, 7 Drawing Sheets

(51) Int. Cl.
    *B64D 29/06*     (2006.01)
    *G07C 5/00*     (2006.01)
    *B64F 5/60*     (2017.01)
    *B64C 7/02*     (2006.01)

(52) U.S. Cl.
    CPC ............... *B64F 5/60* (2017.01); *G07C 5/008* (2013.01); *H01Q 1/286* (2013.01)

(58) Field of Classification Search
    CPC .. G01C 5/0808; G01C 5/0816; G01C 5/0841; B64C 7/02
    See application file for complete search history.

(56) References Cited

U.S. PATENT DOCUMENTS

| | | | | |
|---|---|---|---|---|
| 5,184,141 | A * | 2/1993 | Connolly | H01Q 1/005 244/126 |
| 5,437,091 | A * | 8/1995 | Norman | H01Q 9/0471 29/600 |
| 5,440,300 | A | 8/1995 | Spillman, Jr. | |
| 5,497,961 | A * | 3/1996 | Newton | B64D 29/00 244/54 |
| 5,646,633 | A * | 7/1997 | Dahlberg | H01Q 1/286 343/700 MS |
| 5,724,048 | A | 3/1998 | Remondiere | |
| 6,047,925 | A | 4/2000 | Rivera et al. | |
| 6,198,445 | B1 * | 3/2001 | Alt | H01Q 1/28 343/705 |
| 6,943,699 | B2 * | 9/2005 | Ziarno | B64D 29/00 340/945 |
| 7,109,942 | B2 | 9/2006 | McCarville et al. | |
| 7,461,444 | B2 | 12/2008 | Deaett et al. | |
| 7,624,951 | B1 * | 12/2009 | Kraft | B64C 1/36 244/1 R |
| 7,628,879 | B2 | 12/2009 | Ackerman | |
| 7,860,664 | B2 | 12/2010 | Loomis et al. | |
| 8,026,857 | B2 * | 9/2011 | Bommer | H01Q 1/007 343/705 |
| 8,514,136 | B2 | 8/2013 | McCarthy et al. | |
| 8,565,998 | B2 * | 10/2013 | Brown | F02C 9/00 701/100 |
| 8,604,981 | B2 | 12/2013 | Ehelen et al. | |
| 8,791,868 | B2 | 7/2014 | McCarthy et al. | |
| 8,847,823 | B2 | 9/2014 | Vos et al. | |
| 9,026,279 | B2 * | 5/2015 | Ziarno | G05B 23/0213 701/14 |
| 2004/0196192 | A1 * | 10/2004 | Boyd | H01Q 1/28 343/700 MS |
| 2004/0206818 | A1 * | 10/2004 | Loda | G06Q 10/06 235/424 |
| 2008/0054645 | A1 | 3/2008 | Kulkarni et al. | |
| 2008/0126111 | A1 * | 5/2008 | Loda | H04L 67/1095 701/1 |
| 2011/0133950 | A1 | 6/2011 | Subramanian et al. | |
| 2011/0280279 | A1 | 11/2011 | Gregory et al. | |
| 2013/0132034 | A1 * | 5/2013 | Wilson | G01M 5/00 702/183 |
| 2014/0114549 | A1 * | 4/2014 | Ziarno | G05B 23/0213 701/100 |
| 2015/0028160 | A1 | 1/2015 | Roncz | |
| 2015/0110613 | A1 * | 4/2015 | Aten | B64C 7/02 415/182.1 |
| 2015/0207214 | A1 | 7/2015 | Wallace | |
| 2015/0295309 | A1 | 10/2015 | Manry, Jr. et al. | |
| 2015/0303586 | A1 | 10/2015 | Hafenrichter et al. | |

* cited by examiner

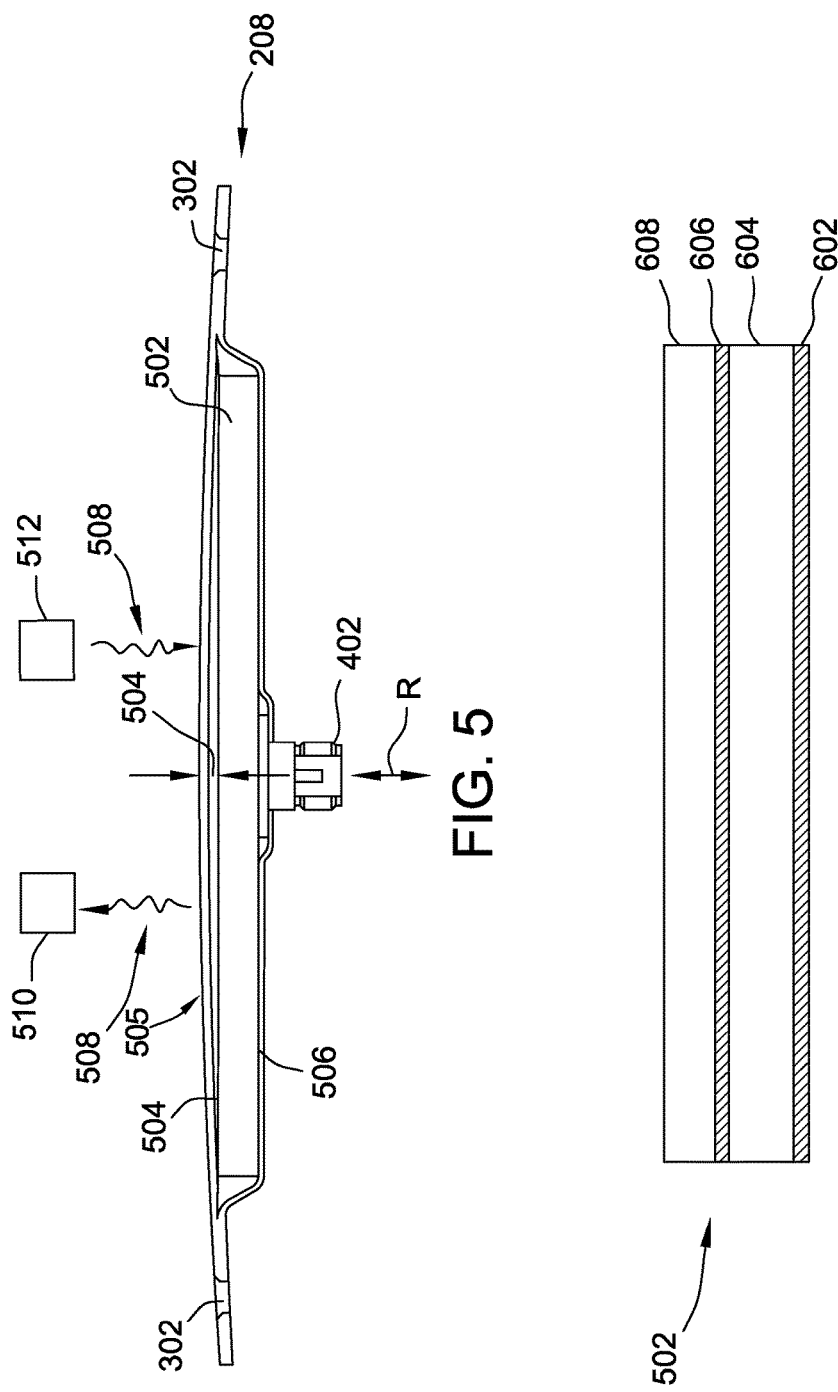

WIRELESS AIRCRAFT ENGINE MONITORING SYSTEM

BACKGROUND

The field of the disclosure relates generally to aircraft engine monitoring, and more particularly, to aircraft engine diagnostics, including the usage of an antenna embedded composite panel that wirelessly facilitates transmission of engine data through a nacelle.

Known aircraft engines typically are enclosed in a nacelle that protects the complex engine components from foreign objects that include flying debris and birds. The nacelle also provides an aerodynamic fairing for the aircraft engine and provides a flow path for engine thrust. Moreover, minimizing weight is crucial in aircraft and nacelle construction, and many known nacelles are manufactured with aluminum or a carbon fiber reinforced polymer material that is light-weight, durable, strong, and capable of meeting the structural and functional requirements of the aircraft propulsion system, including protecting and supporting the weight of the engine. However, materials such as aluminum and carbon fiber-reinforced polymer highly attenuate radio and wireless signals, and thus, it remains difficult to wirelessly and directly transmit and receive engine data to/from outside the nacelle through these types of materials. As a result, aircraft engine maintenance crews must open or remove one or more fan cowls or use a service panel or door in order to acquire engine data captured by an engine control unit. This type of manual inspection and manual engine data acquisition is time consuming and expensive because of both the labor and the need to shut down the engine. Manual data acquisition may be done only when the aircraft makes a shop maintenance visit, and as a result, timely data is not available. Moreover, manual engine data acquisition poses greater risk of damage to the engine and nacelle during the engine data acquisition process.

BRIEF DESCRIPTION

In one aspect, an engine monitoring system for an aircraft engine is provided. The aircraft engine has a nacelle extending annularly thereabout and includes at least one sensor positioned radially inward from the nacelle. The system includes an engine control device communicatively coupled to the at least one sensor. The engine control device is configured to at least one of receive engine data from the at least one sensor and receive instruction data from a transmitter device positioned radially outward from a radially outward surface of the nacelle. The system also includes a composite panel including at least a portion of the nacelle and a ground plane positioned radially inward from a radially outward surface of the nacelle and an antenna communicatively coupled to the engine control device. The antenna is configured to at least one of receive the engine data from the engine control device and to transmit the engine data to a receiver device positioned radially outward from the radially outward surface of the nacelle, and receive the instruction data from the transmitter device and to transmit the instruction data to the engine control device. The composite panel further includes a radome positioned radially outward from the ground plane.

In another aspect, a composite panel for monitoring an aircraft engine is provided. The aircraft engine includes a nacelle extending annularly thereabout, at least one sensor positioned radially inward from the nacelle, and an engine control device communicatively coupled to the at least one sensor. The engine control device is configured to at least one of receive engine data from the at least one sensor and receive instruction data from a transmitter device positioned radially outward from a radially outward surface of the nacelle. The composite panel includes at least a portion of the nacelle and a ground plane positioned radially inward from the radially outward surface of the at least a portion of the nacelle. The composite panel also includes an antenna communicatively coupled to the engine control device. The antenna is configured to at least one of receive the engine data from the engine control device and to transmit the engine data to a receiver device positioned radially outward from the radially outward surface of the nacelle, and receive the instruction data from the transmitter device and to transmit the instruction data to the engine control device. The composite panel further includes a radome positioned radially outward from the ground plane.

In yet another aspect, an aircraft is provided. The aircraft includes an aircraft engine having a nacelle extending annularly thereabout. The aircraft engine also includes at least one sensor positioned radially inward from the nacelle and an engine control device communicatively coupled to the at least one sensor. The engine control device is configured to at least one of receive engine data from the at least one sensor and receive instruction data from a transmitter device positioned radially outward from a radially outward surface of the nacelle. The aircraft engine also includes a composite panel including at least a portion of the nacelle and a ground plane positioned radially inward from the radially outward surface of the nacelle. The composite panel also includes an antenna communicatively coupled to the engine control device. The antenna is configured to at least one of receive the engine data from the engine control device and to transmit the engine data to a receiver device positioned radially outward from the radially outward surface of the nacelle, and receive the instruction data from the transmitter device and to transmit the instruction data to the engine control device. The composite panel further includes a radome positioned radially outward from the ground plane.

DRAWINGS

These and other features, aspects, and advantages of the present disclosure will become better understood when the following detailed description is read with reference to the accompanying drawings in which like characters represent like parts throughout the drawings, wherein:

FIG. 5 is a cross-sectional view of a portion of the composite panel shown in FIG. 2;

FIG. 6 is a cross-sectional view of a portion of the embedded antenna structure shown in FIG. 5;

Figure 1:
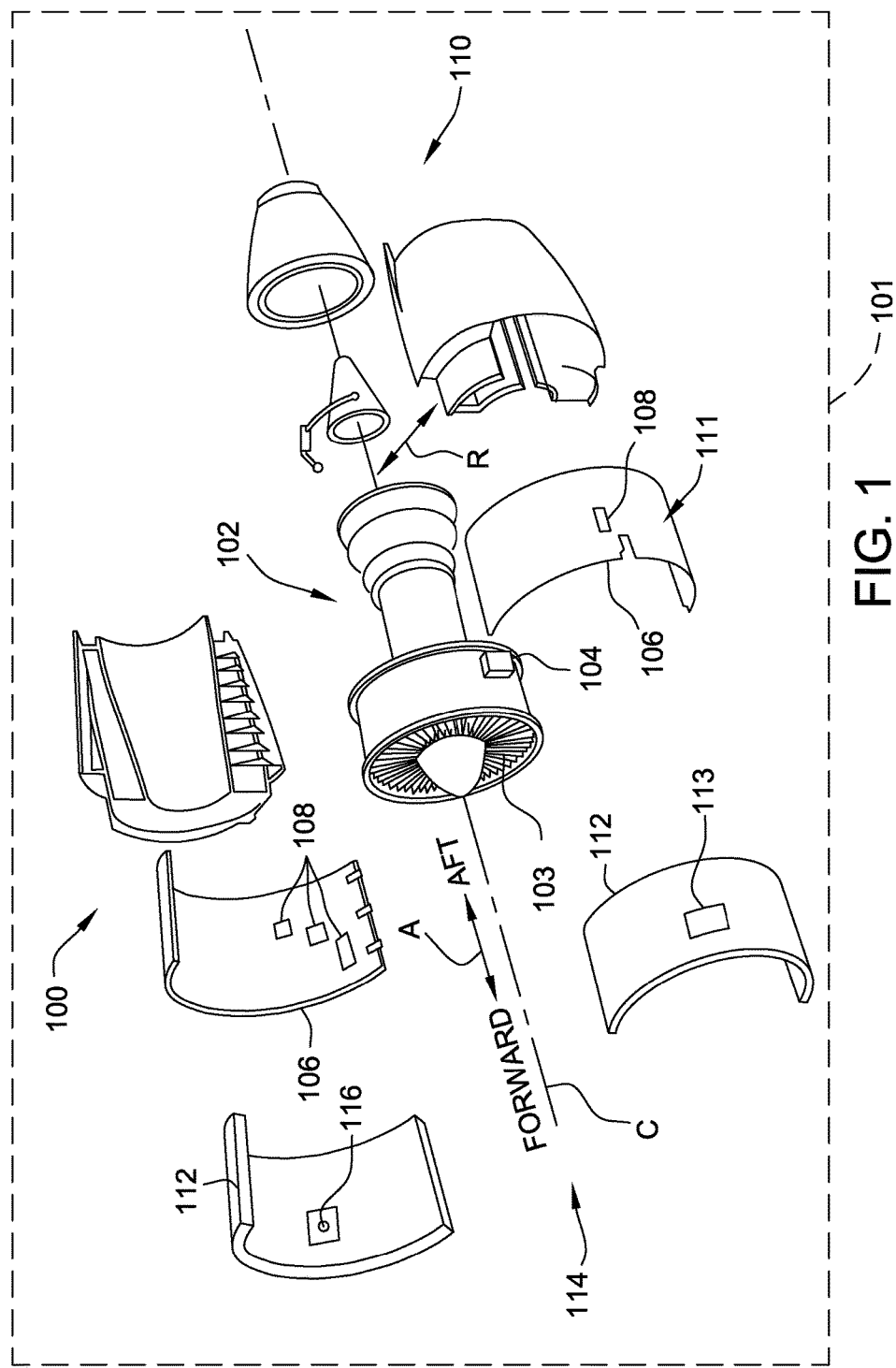
FIG. 1 is an exploded schematic diagram of an exemplary aircraft engine and nacelle.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The monitoring systems described herein wirelessly, through a nacelle, facilitate the measurement of one or more environmental or engine conditions experienced by an engine during operation or non-operation. For example and without limitation, the one or more environmental conditions experienced by an aircraft engine include temperature, dust, vibration, chemical contamination, heat expansion, and strain of various components, such as rotary brackets, fuel lines, and other components of the engine. Additionally, the monitoring system measures and records aspects of engine performance, such as thrust, air intake, and fuel usage and efficiency. These measurements are stored as engine data for later use and to assist maintenance crews and engineers in identifying repairs and other maintenance activities that need to be performed on an aircraft engine (e.g., a component of an aircraft engine from which an abnormal amount of vibration was detected during flight). As described herein, "engine data" may refer to not only environmental condition measurements but also, for example and without limitation, engine manufacturer, model, or any other specifications relating to the engine.

The system described herein advantageously includes an antenna embedded within a composite panel configured to couple or attach to the nacelle. The embedded antenna composite panel is communicatively coupled to an engine control device that is coupled to the engine and configured to acquire engine data. Moreover, the antenna embedded in the composite panel facilitates the transmission of engine data from the engine control device from within the nacelle to a receiver host without a technician having to open the nacelle or to physically access the engine through a service door. This configuration reduces the amount of time and resources expended in aircraft engine maintenance because engine data may be quickly and efficiently downloaded through the use of a mobile device that is proximate to the nacelle. Alternatively, the engine data may also be downloaded through the use of a cellular network or other ground based wireless communication system, such as WiFi. In some embodiments, the antenna embedded in the composite panel further facilitates wireless transmission of environmental condition data and monitored engine operating conditions, for example and without limitation, status signals transmitted to pilots about whether or not aircraft engine cowl latches are fully secured, and operational parameters of secondary structure of the aircraft engine including, without limitation, vibrations of the pylon, nacelle, and the reverser. Further, in some other embodiments, engine data includes information, including sensor-acquired data, facilitating health monitoring of aircraft engine rotating components such as fans, and other non-rotating engine components including various devices and systems (e.g., reverser actuators) mounted to the nacelle and the fan case. Therefore, such integration of an antenna embedded within a composite panel coupled to a nacelle allows for more robust, cheaper, and faster engine data acquisition. Further, the antenna embedded in the composite panel facilitates receiving instructions (e.g., instruction data) from an operator or associated system about which engine parameters to save. For example, prior to flight use of the aircraft engine, an engine control device receives instruction data for the scheduled flight communicated through the antenna embedded in the composite panel on the nacelle. The engine control device will save these parameters during flight and at the end of the flight, i.e., when the aircraft is on the ground, and the data associated with these parameters is transmitted to the user through the antenna embedded in the composite panel. Similarly, the antenna embedded in the composite panel enables receipt of user-initiated software updates for the engine control device and associated systems. As such, in the exemplary embodiments shown and described herein, embedded antenna is enabled to function as a transceiver in addition to one of a receiver and a transmitter.

FIG. 1 is an exploded schematic view of an engine monitoring system 100 that includes an engine 102 coupled to an engine control device 104, for example and without limitation, a sensor monitoring unit, a controller, or any other similar device enclosed within a nacelle 110. In the exemplary embodiment, engine 102 is embodied in an aircraft engine for an aircraft 101. Engine 102 includes a centerline C defining forward and aft axial directions A. Alternatively, engine 102 is any other turbomachine, including, without limitation, a steam turbine engine, an aircraft engine, a wind turbine, and a compressor. In the exemplary embodiment, engine 102 includes a fan 103, and a compressor section (not shown) that is coupled downstream from (i.e., aft), and in flow communication with fan 103. Furthermore, nacelle 110 includes at least two fan cowls 106 that have one or more service doors 108 that may include, for example and without limitation, a sensor panel door, oil door, pressure release door, or any other type of door generally situated within nacelle 110. As described herein, these service doors 108 may be retrofitted with a composite panel that includes an embedded antenna (described below) or may be embedded into the structure of at least one of fan cowl 106 (including external portions of surfaces thereof), other external surfaces of nacelle 110, and external surfaces of a pylon (not shown) at the time of manufacturing (also described below). Nacelle 110 further defines a circumferential and radially outward-most surface 111 (i.e., boundary) of engine 102, where substantially all components of engine 102 and engine monitoring system 100 are positioned radially inward from nacelle 110 to centerline C in a radial direction R, and where a forward portion of nacelle 110 and an inlet housing 112 defines an air inlet flowpath 114 for fan 103. Inlet housing 112 also contains one or more additional service doors 113 and one or more inlet sensors 116 (e.g., at least one of a temperature sensor and a pressure sensor) positioned under the one or more additional service doors 113.

Inlet sensors 116 and other types of sensors (e.g., including, without limitation, vibration sensors, accelerometers, air and fluid flow sensors, not shown) are, in operation, placed at various locations within engine 102 where they at least one of detect, measure, record, display, report, transmit, and store engine data related to engine 102 performance including, without limitation, while engine 102 is running. In the exemplary embodiment, at least one of engine control device 104, inlet sensors 116, and other types of sensors is operatively coupled to at least one control-related engine component (not shown) including, without limitation, valve actuators, fan blade pitch actuators, pumps (e.g., for fuel and coolant), and the like, and thereby facilitate control of engine 102 operating parameters. In the exemplary embodiment, engine data acquired by inlet sensors 116 and other types of sensors is transmitted to engine control unit 104, and engine control unit 104 further transmits the engine data to embedded antenna. In other embodiments, not shown, at least one of inlet sensors 116 and other sensor types transmit engine data directly to embedded antenna. In yet other embodiments, not shown, a first type of engine data representative of operating conditions of engine 102 is transmitted from at least one of inlet sensors 116 and other sensor types directly to embedded antenna, and a second type of engine data is first transmitted from at least one of inlet sensors 116 and other sensor types to engine control unit 104. Further, in the exemplary embodiment, at least one of inlet sensors 116 and other types of sensors are configured to receive data from at least one of engine control unit 104 and embedded antenna. For example, and without limitation, at least one of inlet sensor 116 and other sensor types includes a sensor capable of at least one of detecting, measuring, recording, displaying, reporting, transmitting, and storing a plurality of engine 102 operational parameters. In such cases, a user of engine monitoring system 100 transmits instruction data to and through embedded antenna to at least one of engine control device 104, inlet sensors 116, and other sensor types to establish which at least one of the plurality of engine 102 operational parameters to employ the multi-parameter sensor for. As such, in the exemplary embodiment, embedded antenna is embodied in a transceiver. In another embodiment, not shown, embedded antenna is also positioned beneath additional service door 113 and at least one of inlet sensors 116 and other sensor types is incorporated into embedded antenna. In still other embodiments, not shown, at least one of service door 108 and additional service door 113 houses beneath it at least one of a PNA1 access panel and a transcowl actuator fitting access panel. Also, in the exemplary embodiment, engine control device 104 includes a radio (not shown) coupled to the embedded antenna in nacelle 110 (described below) and configured to generate radio frequency waveforms appropriate to a communication protocol used in engine monitoring system 100. Radio is coupled to embedded antenna through a radio frequency transmission medium, examples of which include, without limitation, a coaxial cable, a twisted pair, and a transmission line.

Figure 2:
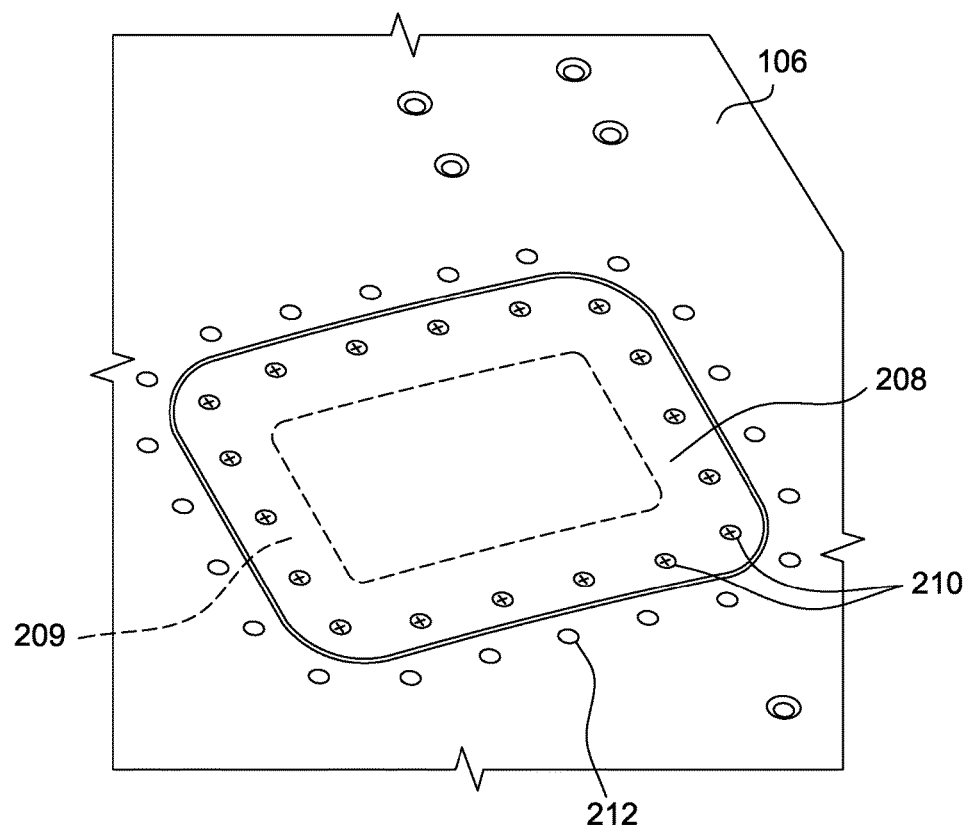
FIG. 2 is a schematic perspective view of an exemplary antenna embedded composite panel that is affixed to a fan cowl of the nacelle shown in FIG. 1.

FIG. 2 is a schematic perspective view of an exemplary antenna embedded composite panel 208 affixed to fan cowl 106 of nacelle 110 (shown in FIG. 1) that may utilized in facilitating the wireless transmission of engine data. FIG. 2 depicts the exterior surface of fan cowl 106 and the radiating side of antenna embedded composite panel 208. In the exemplary embodiment, because fan cowl 106 is constructed of a material that highly attenuates wireless signals, antenna embedded composite panel 208 facilitates the propagation of wireless signals in conjunction with engine control device 104. Moreover, antenna embedded composite panel 208 is coupled to a support flange 209 of fan cowl 106 using a plurality of panel fasteners 210, for example and without limitation, screws, bolts, rivets, or any other means of affixing antenna embedded composite panel 208 to fan cowl 106 in a removable fashion. Support flange 209 is affixed to fan cowl 106 by a plurality of flange fasteners 212, such as and without limitation, rivets, screws, and bolts, thus facilitating removal of antenna embedded composite panel 208 from the exterior of engine 102. In other embodiments, not shown, antenna embedded composite panel 208 is affixed to fan cowl 106 through at least one hinge (not shown). In still other embodiments, not shown, antenna embedded composite panel 208 is not affixed to fan cowl 106 of nacelle 110, but rather is positioned on other portions of engine 102 including, without limitation, an inlet outer barrel, a thumbnail fairing, and a reverser trans cowl. In yet other embodiments, not shown, at least one of the inlet outer barrel, the thumbnail fairing, and the reverser transcowl includes at least one of an access cover or a door used to house the antenna embedded composite panel 208.

Figure 3:
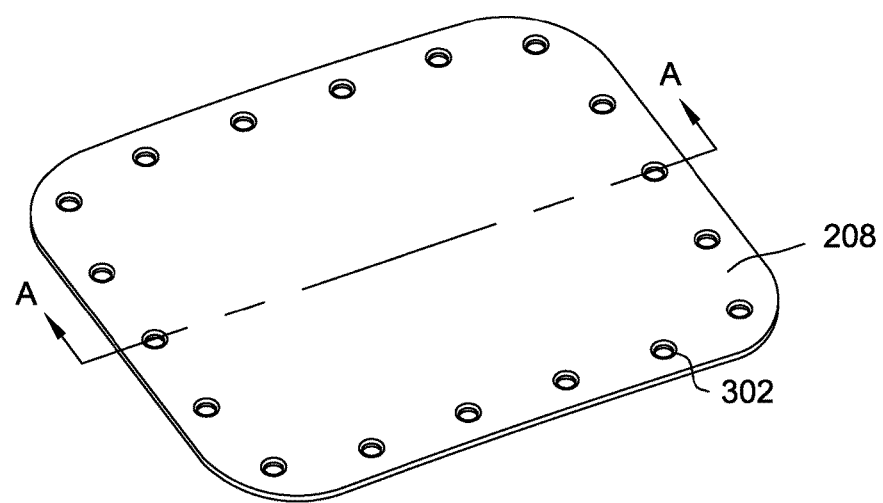
FIG. 3 is a schematic perspective top view of the antenna embedded composite panel shown in FIG. 2.
Figure 4:
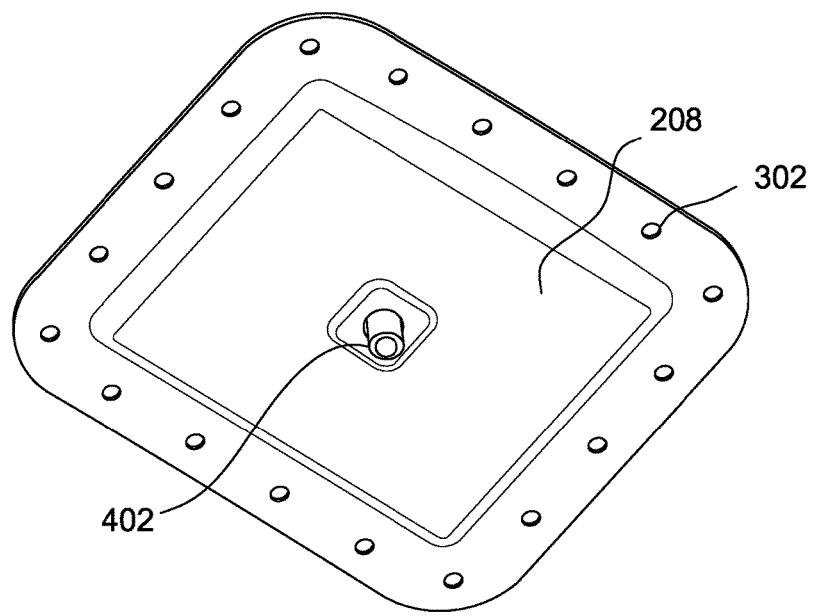
FIG. 4 is a schematic perspective bottom view of the antenna embedded composite panel shown in FIG. 2.

FIGS. 3 and 4 are a schematic perspective top view and a bottom view, respectively, of antenna embedded composite panel 208 that is not affixed to fan cowl 106 (or otherwise nacelle 110) constructed of a material that highly attenuates wireless signals. Antenna embedded composite panel 208 includes fastener holes 302 that facilitate coupling of antenna embedded composite panel 208 to fan cowl 106. An antenna connector 402 facilitates at least one of a transmitter device and a receiver device (not shown) to electronically and communicatively couple to antenna embedded composite panel 208. Antenna connector 402 includes any type of antenna connector that allows a device to receive, transmit, or otherwise control the antenna embedded composite panel 208. For example and without limitation, antenna connector 402 may be configured to connect with coaxial cable to radio (not shown) on engine 102 or engine control device 104.

FIG. 5 is a cross-sectional view of a portion of antenna embedded composite panel 208 as shown along line "A-A" (shown in FIG. 3). As previously discussed, antenna embedded composite panel 208 includes antenna connector 402 and fastener holes 302 to attach antenna embedded composite panel 208 to support flange (not shown) of fan cowl 106. Moreover, antenna embedded composite panel 208 includes a panel support structure 506 that encloses and supports embedded antenna structure 502. In the exemplary embodiment, a material of construction of panel support structure 506 includes any number of composites, aluminum, or carbon fiber. In other embodiments, a material of construction of panel support structure 506 includes radio frequency transparent materials of construction. Furthermore, antenna embedded composite panel 208 includes an embedded antenna structure 502, for example and without limitation, an antenna circuit board and a printed circuit board that facilitates transmission and reception of wireless signals and includes multiple layers as described below. Antenna embedded composite panel 208 also includes a radome structure 504 that protects embedded antenna structure 502 from physical damage and degradation. In the exemplary embodiment, a material of construction of a radially outward surface 505 of radome structure 504 is the same as a material of construction of panel support structure 506 and radially outward surface 111 of engine 102, while in other embodiments, the radially outward surface 505 of radome structure 504 includes a different material of construction relative to at least one of panel support structure 506 and radially outward surface 111 of engine 102. Flying debris and environmental conditions such as precipitation, solar radiation damage, and ice may cause physical damage and degradation to the components of embedded antenna structure 502. The top or surface area of radially outward surface 505 of radome structure 504 is also advantageously shaped or molded to seamlessly fit the curves and surface of surrounding fan cowl 106. In this manner, the shaped form of the surface of radome structure 504 maintains the aerodynamic properties and air profile of nacelle 110. In operation, in the exemplary embodiment, embedded antenna structure is configured to at least one of propagate (i.e., transmit) and receive at least one electromagnetic signal 508 through radome structure 504 to and from a receiver device 510 and a transmitter device 512, respectively, positioned radially outward from the radially outward surface 505 of radome structure 504.

FIG. 6 is a cross-sectional view of a portion of the embedded antenna structure 502 shown in FIG. 5. Embedded antenna structure 502 may be constructed to implement any number of different types of antenna, for example and without limitation, a patch antenna, a microstrip antenna, a microstrip patch antenna, a planar inverted-F antenna, or any other suitable antenna. Moreover, embedded antenna structure 502 may facilitate the transmission of engine data from engine control device 104 using any number of wireless communication protocols including, for example and without limitation, wireless local area network (WLAN), cellular protocol (e.g., Code Division Multiple Access (CDMA), LTE, Global System for Mobiles (GSM), etc.), WiMax™, Bluetooth™, or any other suitable wireless protocol. Furthermore, embedded antenna structure 502 is configured to transmit the engine data at one or more frequency signals in combination with any number of wireless protocols. For example, and without limitation, at least one of engine control device 104 (not shown) and embedded antenna structure 502 is configured to at least one of transmit and receive at least one the engine data and the instruction data over a predetermined range of a plurality of frequencies. In other embodiments, embedded antenna structure 502 is also configured to receive signals at one or more frequencies including, without limitation, user instructions (e.g., instruction data) and software updates for engine control device 104 and associated devices used in engine monitoring system 100.

For example, FIG. 6 illustrates embedded antenna structure 502 for an exemplary patch antenna in which embedded antenna structure 502 includes a ground plane 602, a substrate layer 604, a radiating element 606, and a radome element 608. While only four layers are shown in FIG. 6, any number of layers may be utilized and may be situated in any order that enables operation of embedded antenna structure 502 as described herein. In the exemplary embodiment, a material of construction of ground plane 602 is a conductive metal such as copper (e.g., a standard circuit board ground plane). In other embodiments, a material of construction of ground plane 602 is a carbon fiber-reinforced polymer material, including, without limitation, a polymer in combination with a metal such as copper. In still other embodiments, not shown, embedded antenna structure 502 includes radio frequency transparent materials of construction on both radially inward and radially outward surfaces of embedded antenna structure 502, where such other embodiments do not include ground plane 602.

Referring to FIGS. 5 and 6, ground plane 602 may flank a panel support structure 506 located radially inward from nacelle 110 (i.e., closer to engine 102). Ground plane 602 provides a reflecting surface for radiating element 606. Substrate layer 604 is constructed from any type of dielectric material including, for example and without limitation, FR-4 (glass epoxy), bakelite, Rogers RO4003, Taconic TLC, RT Duroid, or any other suitable dielectric material. Ground plane 602 may be positioned in a direction toward engine 102 or situated in a location closest to engine 102. Substrate layer 604 can be designed for any type of radio wavelength and can vary in thickness. Radiating element 606 may include a patch or sheet of metal, a microstrip extending to the patch, or any other suitable type of antenna. The shape of the patch may be square, circular, or any suitable shape and the thickness of the antenna may vary. Radome element 608 may be constructed from, for example and without limitation, fiberglass, plastic (e.g., polycarbonate, acrylic), Teflon™, laminate, or any other suitable radio frequency transparent material to facilitate transmission and receipt of radio frequency signals to and from, respectively, embedded antenna structure 502 including, without limitation, radio frequency signals carrying at least one of engine data and instruction data. Moreover, radome element 608 and radome structure 504 may be used in combination or alternatively, radome element 608 may not be present and radome structure 504 may be solely used. Radome structure 504 may be positioned in a direction extending away from engine 102 or situated in a location farthest away from engine 102.

Figure 7:
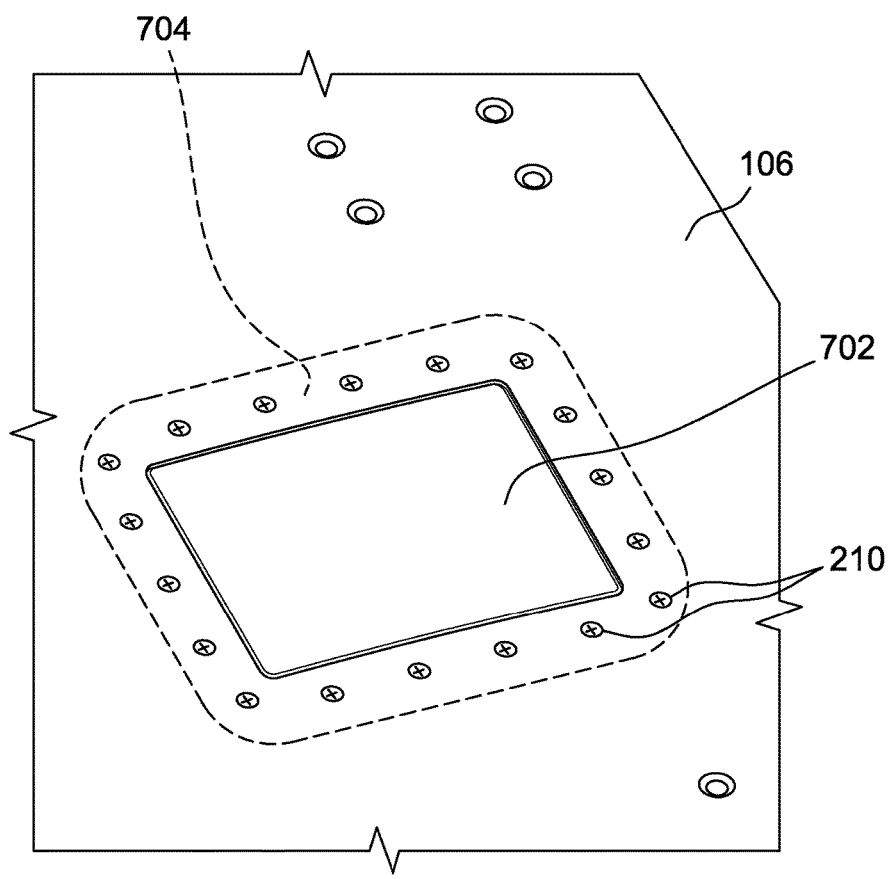
FIG. 7 is schematic perspective view of an alternative antenna embedded composite panel that is affixed to a fan cowl of the nacelle shown in FIG. 1.

FIG. 7 is a schematic perspective view of an alternative antenna embedded composite panel 702 affixed to fan cowl 106 of nacelle 110 that may utilized in facilitating wireless transmission of engine data. FIG. 7 depicts the exterior surface of fan cowl 106 and the radiating side of antenna embedded composite panel 702 that includes a different service door 108 shape and different coupling mechanism. In the exemplary embodiment, because fan cowl 106 is constructed of a material that highly attenuates wireless signals, antenna embedded composite panel 702 facilitates propagation of wireless signals in conjunction with engine control device 104. Moreover, antenna embedded composite panel 702 is coupled to fan cowl 106 using panel fasteners 210, for example and without limitation, screws, bolts, rivets, or any other means of affixing antenna embedded composite panel 702 to fan cowl 106 in a removable fashion. Antenna embedded composite panel 702 includes a flange 704 that allows for panel fasteners 210 to assist in affixing antenna embedded composite panel 702 to fan cowl 106. Also, in the alternative embodiment, flange 704 of antenna embedded composite panel 702 nests and is affixed by panel fasteners 210 to an interior surface of fan cowl 106, which facilitates a lighter weight implementation relative to the embodiment shown in FIG. 2, but requires removal from the backside (i.e., radially inward side facing engine 102) of antenna embedded composite panel 702.

Figure 8:
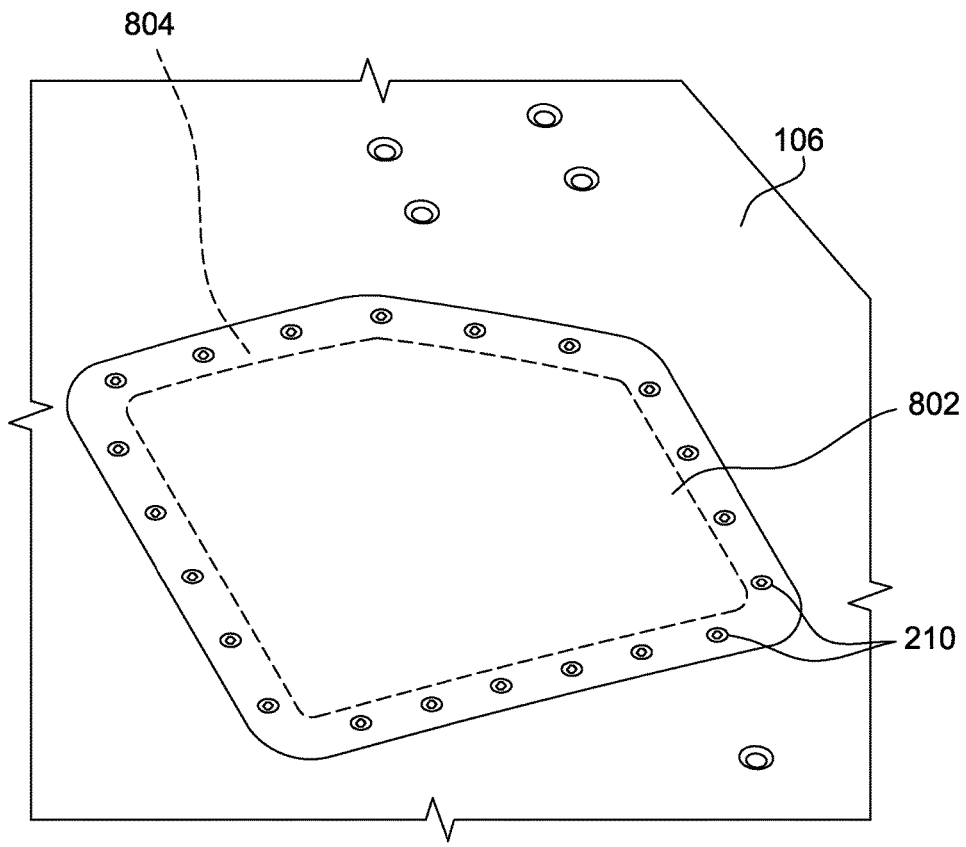
FIG. 8 is schematic perspective view of another alternative antenna embedded composite panel that is affixed to the fan cowl of the nacelle shown in FIG. 1.

FIG. 8 is a schematic perspective view of another alternative antenna embedded composite panel 802 affixed to fan cowl 106 of nacelle 110 that may be utilized in facilitating wireless transmission of engine data. FIG. 8 depicts the exterior surface of fan cowl 106 and the radiating side of antenna embedded composite panel 802 that includes a different service door 108 shape and different coupling mechanism. In the exemplary embodiment, because fan cowl 106 is constructed of a material that highly attenuates wireless signals, antenna embedded composite panel 802 facilitates the propagation of wireless signals in conjunction with engine control device 104. Moreover, antenna embedded composite panel 802 is coupled to a supporting flange 804 of the fan cowl 106 using panel fasteners 210, for example and without limitation, screws, bolts, rivets, or any other means of affixing antenna embedded composite panel 802 to fan cowl 106 in a removable fashion. In other embodiments, not shown, antenna embedded composite panel 802 is affixed to fan cowl 106 through at least one hinge (not shown), where antenna embedded composite panel 802 serves as an access door for other components of engine 102 including, without limitation, an oil tank access door.

Figure 9:
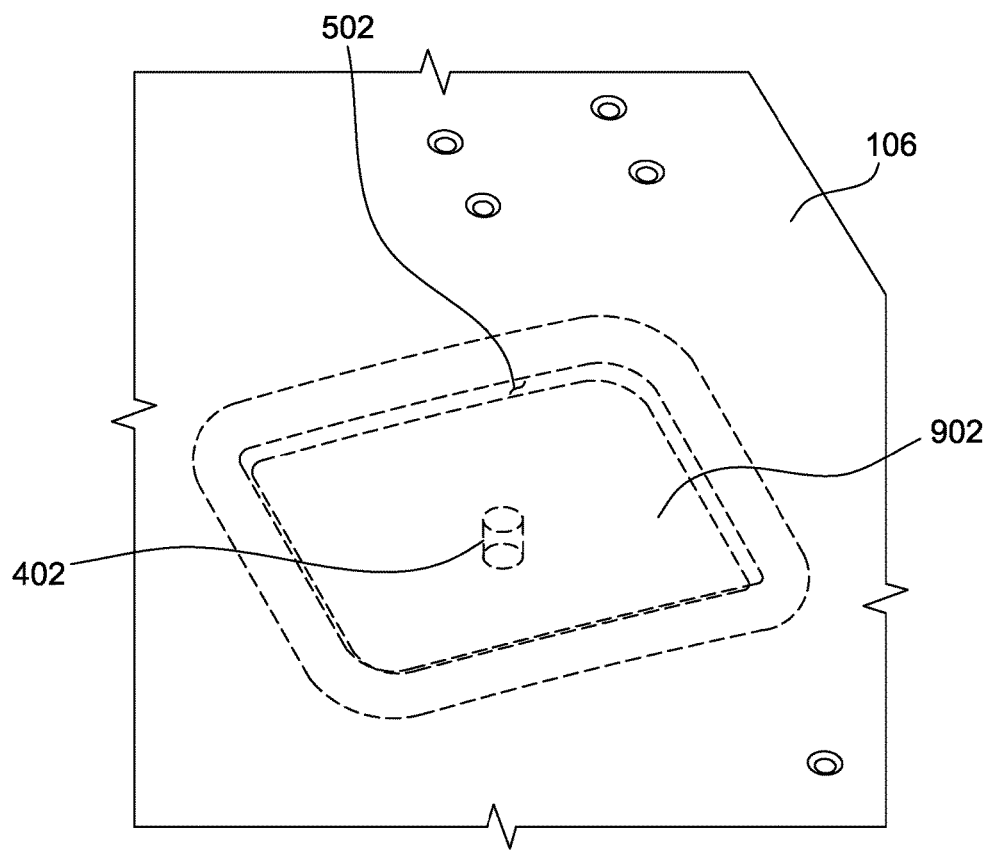
FIG. 9 is schematic perspective view of yet another alternative antenna embedded composite panel that is embedded into the fan cowl of the nacelle shown in FIG. 1.

FIG. 9 is a schematic perspective view of yet another alternative antenna embedded composite panel 902 that is embedded or built into fan cowl 106 of nacelle 110 to facilitate wireless transmission of engine data. FIG. 9 depicts the exterior surface of fan cowl 106 and the radiating side of antenna embedded composite panel 902 that is embedded into fan cowl 106 during the manufacturing process. In the exemplary embodiment, because fan cowl 106 is constructed of a material that highly attenuates wireless signals, antenna embedded composite panel 902 facilitates the propagation of wireless signals in conjunction with engine control device 104. Because antenna embedded composite panel 902 is embedded into fan cowl 106 at the time of manufacturing, antenna embedded composite panel 902 does not require any fasteners allowing the panel support structure 506 to be seamlessly embedded with fan cowl 106.

The monitoring systems described herein wirelessly facilitate, through a nacelle, the measurement of one or more environmental or engine conditions experienced by an engine during operation or non-operation. For example and without limitation, the one or more environmental conditions experienced by an aircraft engine include temperature, vibration, dust, chemical contamination, heat expansion, and strain of various components, such as rotary brackets, fuel lines, and other components of the engine. Additionally, the monitoring system measures and records aspects of engine performance, such thrust, air intake, and fuel efficiency. These measurements assist maintenance crews and engineers in identifying repairs and other maintenance activities that need to be performed on an aircraft engine (e.g., a component of an aircraft engine from which an abnormal amount of vibration was detected during flight). These measurements of environmental and engine conditions are stored as engine data for later use. As described herein, "engine data" may refer to not only environmental condition measurements but also, for example and without limitation, engine manufacturer, model, or any other specifications relating to the engine.

The system described herein advantageously includes an antenna embedded within a composite panel configured to couple or attach to the nacelle. The embedded antenna composite panel is communicatively coupled to an engine control device that is coupled to the engine and configured to acquire engine data. Moreover, the antenna embedded in the composite panel facilitates the transmission of engine data from the engine control device from within the nacelle to a receiver host without a technician having to open the nacelle or to physically access the engine through a service door. This configuration reduces the amount of time and resources expended in aircraft engine maintenance because engine data may be quickly and efficiently downloaded through the use of a mobile device that is proximate to the nacelle. Alternatively, the engine data may also be downloaded through the use of a cellular network or other ground based wireless communication system such as WiFi. Therefore, such integration of an antenna embedded within a composite panel coupled to a nacelle allows for more robust, cheaper, timely, and faster engine data acquisition.

An exemplary technical effect of the methods, systems, and apparatus described herein includes at least one of: (a) facilitating wireless transmission of environmental condition data, monitored engine operating conditions, and engine data, for example and without limitation, temperature, vibration, heat expansion, strain, chemical contamination, thrust, air intake, and fuel efficiency for an aircraft engine without physical inspection of a nacelle enclosure; (b) enabling the measurement of environmental and engine conditions regardless the material of which the nacelle is constructed; and (c) enabling more frequent and cheaper inspection of the aircraft engine which potentially decreases the frequency of maintenance and unscheduled repairs, and improves the service life of the aircraft engine.

Exemplary embodiments of a monitoring system are described above in detail. The monitoring system and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of machines enclosed with materials that highly attenuated wireless signals, and are not limited to practice with only the monitoring system described herein. Rather, the exemplary embodiment can be implemented and utilized in connection with many other applications, equipment, and systems that may benefit from using antenna embedded composite panels.

Although specific features of various embodiments of the disclosure may be shown in some drawings and not in others, this is for convenience only. In accordance with the principles of the disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An engine monitoring system for an aircraft engine, the aircraft engine having a nacelle extending annularly thereabout and including at least one sensor positioned radially inward from the nacelle, said system comprising:
    an engine control device communicatively coupled to the at least one sensor, said engine control device configured to at least one of receive engine data from the at least one sensor and receive instruction data from a transmitter device positioned radially outward from a radially outward surface of the nacelle; and wherein at least a portion of the nacelle comprises a composite panel, said composite panel comprising:
        a ground plane positioned radially inward from the radially outward surface of the nacelle;
        a panel support structure;
        an antenna enclosed within said panel support structure, said enclosed antenna communicatively coupled to said engine control device, said antenna configured to at least one of:
            receive the engine data from said engine control device and to transmit the engine data to a receiver device positioned radially outward from the radially outward surface of the nacelle; and
            receive the instruction data from the transmitter device and to transmit the instruction data to said engine control device; and
        a radome positioned radially outward from said ground plane for protecting said antenna from physical damage and degradation.

2. The engine monitoring system in accordance with claim 1, the nacelle comprising a plurality of doors, wherein said composite panel further comprises at least one door of the plurality of doors.

3. The engine monitoring system in accordance with claim 1, wherein said composite panel is at least partially embedded within the nacelle.

4. The engine monitoring system in accordance with claim 1, wherein said radome comprises a radome material that is substantially transparent to electromagnetic signals.

5. The engine monitoring system in accordance with claim 4, wherein said radome material is fiberglass.

6. The engine monitoring system in accordance with claim 1, wherein the engine data includes information pertaining to operation of the aircraft engine including at least one of during flight service and during ground service.

7. The engine monitoring system in accordance with claim 6, wherein the engine data includes diagnostic data related to repair and maintenance.

8. The engine monitoring system in accordance with claim 1, wherein said antenna includes at least one of a patch antenna, a microstrip antenna, a microstrip patch antenna, and a planar inverted-F antenna.

9. The engine monitoring system in accordance with claim 1, wherein said antenna is further configured to at least one of transmit and receive at least one of the engine data and the instruction data using a wireless communication protocol including at least one of WiFi, cellular, WiMax™, Bluetooth™, and a wireless local area network (WLAN).

10. The engine monitoring system in accordance with claim 1, wherein said antenna is further configured to at least one of transmit and receive at least one of the engine data and the instruction data over a range of a plurality of frequencies.

11. A composite panel for monitoring an aircraft engine, the aircraft engine including a nacelle extending annularly thereabout, at least one sensor positioned radially inward from the nacelle, and an engine control device communicatively coupled to the at least one sensor, the engine control device configured to at least one of receive engine data from the at least one sensor and receive instruction data from a transmitter device positioned radially outward from a radially outward surface of the nacelle, wherein at least a portion of the nacelle comprises a composite panel, said composite panel comprising:
    a ground plane positioned radially inward from the radially outward surface of said at least a portion of the nacelle;

a panel support structure, an antenna enclosed within said panel support structure, said enclosed antenna communicatively coupled to said engine control device, said antenna configured to at least one of:

receive the engine data from the engine control device and to transmit the engine data to a receiver device positioned radially outward from the radially outward surface of the nacelle; and receive the instruction data from the transmitter device and to transmit the instruction data to the engine control device; and a radome positioned radially outward from said ground plane for protecting said antenna from physical damage and degradation.

12. The composite panel in accordance with claim 11, the nacelle including a plurality of doors, wherein said composite panel further comprises at least one door of the plurality of doors.

13. The composite panel in accordance with claim 12, wherein said composite panel is at least one of coupled to the nacelle and at least partially embedded within the nacelle.

14. The composite panel in accordance with claim 12, wherein said radome comprises a radome material that is substantially transparent to electromagnetic signals.

15. The composite panel in accordance with claim 14, wherein said radome material is fiberglass.

16. The composite panel in accordance with claim 12, wherein the engine data includes information pertaining to operation of the aircraft engine including at least one of during flight service and during ground service.

17. The composite panel in accordance with claim 16, wherein the engine data includes diagnostic data related to repair and maintenance.

18. The composite panel in accordance with claim 12, wherein said antenna includes at least one of a patch antenna, a microstrip antenna, a microstrip patch antenna, and a planar inverted-F antenna.

19. The composite panel in accordance with claim 12, wherein said antenna is further configured to at least one of transmit and receive at least one of the engine data and the instruction data using a wireless communication protocol including at least one of WiFi, cellular, WiMax™, Bluetooth™, and a wireless local area network (WLAN).

20. An aircraft comprising:

an aircraft engine comprising:

a nacelle extending annularly about said aircraft engine;

at least one sensor positioned radially inward from said nacelle;

an engine control device communicatively coupled to the at least one sensor, said engine control device configured to at least one of receive engine data from the at least one sensor and receive instruction data from a transmitter device positioned radially outward from a radially outward surface of the nacelle; and wherein at least a portion of the nacelle comprises a composite panel, said composite panel comprising:

a ground plane positioned radially inward from the radially outward surface of the nacelle;

a panel support structure;

an antenna enclosed within said panel support structure, said enclosed antenna communicatively coupled to said engine control device, said antenna configured to at least one of:

receive the engine data from said engine control device and to transmit the engine data to a receiver device positioned radially outward from the radially outward surface of the nacelle; and receive the instruction data from the transmitter device and to transmit the instruction data to said engine control device; and a radome positioned radially outward from said ground plane for protecting said antenna from physical damage and degradation.

* * * * *